(12) United States Patent
Moriya et al.

(10) Patent No.: US 11,505,085 B2
(45) Date of Patent: Nov. 22, 2022

(54) POWER SUPPLY SYSTEM IN VEHICLE

(71) Applicant: SUBARU CORPORATION, Tokyo (JP)

(72) Inventors: Fumiyuki Moriya, Tokyo (JP); Hirofumi Yabe, Tokyo (JP); Atsushi Doki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/398,297

(22) Filed: Aug. 10, 2021

(65) Prior Publication Data
US 2022/0055499 A1 Feb. 24, 2022

(30) Foreign Application Priority Data
Aug. 18, 2020 (JP) .............................. JP2020-137777

(51) Int. Cl.
*B60L 58/10* (2019.01)
*F02N 11/08* (2006.01)

(52) U.S. Cl.
CPC .......... *B60L 58/10* (2019.02); *F02N 11/0818* (2013.01); *F02N 11/0866* (2013.01);
(Continued)

(58) Field of Classification Search
CPC ............. F02N 11/0818; F02N 11/0866; F02N 11/087; F02N 2011/0874; F02N 2011/0888; B60L 58/10; B60L 58/18; B60L 2210/10
See application file for complete search history.

(56) References Cited

U.S. PATENT DOCUMENTS

2010/0319645 A1* 12/2010 Yang .................. F02P 3/09
                                                        123/179.5
2010/0319646 A1* 12/2010 Yang .................. F02N 11/14
                                                        123/179.1
(Continued)

FOREIGN PATENT DOCUMENTS

EP            2965398 B1 *  5/2017  .......... F02N 11/0866
JP        2011-046248 A     3/2011
(Continued)

OTHER PUBLICATIONS

Samarth et al., "Improving Electrical Energy Consumption by Application of Integrated Starter Generator for Single Cylinder Engine Applications," Mar. 31, 2020, IJERT, vol. 09, Issue 03 (Year: 2020).*

*Primary Examiner* — John M Zaleskas
(74) *Attorney, Agent, or Firm* — McDermott Will & Emery LLP (57) ABSTRACT

A power supply system for a vehicle including a driving battery, first and second device batteries, a DC-to-DC converter, a control system device, and a specific device includes first and second power lines, first and second switches, and a coupling line. The first power line transmits power from the first device battery to the control system device. The second power line transmits power from the second device battery to the specific device. The first switch is coupled between the DC-to-DC converter and the first power line. The first switch includes a diode disposed in a direction to flow a current to the first power line. The coupling line is configured to transmit power from a node between the DC-to-DC converter and the first switch to the second power line. The second switch selectively opens and closes an electric circuit of the coupling line.

10 Claims, 4 Drawing Sheets

(52) U.S. Cl.
CPC ..... *B60L 2210/10* (2013.01); *B60L 2240/441* (2013.01); *F02N 2011/0888* (2013.01)

(56) References Cited

U.S. PATENT DOCUMENTS

| | | | |
|---|---|---|---|
| 2011/0049910 A1 | 3/2011 | Izumi | |
| 2012/0104767 A1* | 5/2012 | Gibson | B60L 15/20 290/36 R |
| 2012/0330538 A1* | 12/2012 | Spjuth | F02N 11/0866 701/113 |
| 2013/0106195 A1* | 5/2013 | Kusch | B60L 53/11 307/82 |
| 2013/0229049 A1* | 9/2013 | Larsson | F02N 11/0814 307/9.1 |
| 2014/0316651 A1* | 10/2014 | Cho | H02J 7/1423 701/36 |
| 2015/0084566 A1* | 3/2015 | Schneider | H02P 4/00 318/440 |
| 2016/0288651 A1* | 10/2016 | Kinoshita | B60L 3/12 |
| 2016/0288652 A1* | 10/2016 | Suzuki | B60L 50/15 |
| 2016/0290304 A1* | 10/2016 | Yukawa | B60R 16/03 |
| 2017/0197567 A1* | 7/2017 | Iwasaki | B60R 16/033 |
| 2017/0225635 A1* | 8/2017 | Obayashi | F02B 39/10 |
| 2017/0259803 A1* | 9/2017 | Khafagy | B60K 6/28 |
| 2017/0298891 A1* | 10/2017 | Spjuth | F02N 11/0866 |
| 2018/0043788 A1* | 2/2018 | Kuribara | B60L 8/003 |
| 2018/0086330 A1* | 3/2018 | Ito | B60L 58/18 |
| 2018/0297474 A1* | 10/2018 | Lee | G01R 31/007 |
| 2018/0304763 A1* | 10/2018 | Moriya | B60W 10/26 |
| 2018/0335007 A1* | 11/2018 | Shields | B60L 3/04 |
| 2019/0160969 A1* | 5/2019 | Otto | B60L 58/20 |
| 2019/0176798 A1* | 6/2019 | Ford | B60K 6/387 |
| 2019/0305581 A1* | 10/2019 | Kinoshita | H02J 7/1423 |
| 2020/0217290 A1* | 7/2020 | Gibson | H02J 7/1423 |
| 2021/0008986 A1* | 1/2021 | Moriya | H01M 10/44 |
| 2021/0063492 A1* | 3/2021 | Chen | F02N 11/0866 |
| 2021/0094441 A1* | 4/2021 | Sampson | H01M 10/44 |
| 2021/0332782 A1* | 10/2021 | Gibson | F02N 11/006 |
| 2022/0085641 A1* | 3/2022 | Hirota | B60L 50/60 |

FOREIGN PATENT DOCUMENTS

| | | | | |
|---|---|---|---|---|
| JP | 2018071390 A | * | 5/2018 | ............ B60K 6/442 |
| JP | 2018071419 A | * | 5/2018 | ............ B60K 6/448 |

* cited by examiner

POWER SUPPLY SYSTEM IN VEHICLE

CROSS-REFERENCE TO RELATED APPLICATIONS

The present application claims priority from Japanese Patent Application No. 2020-137777 filed on Aug. 18, 2020, the entire contents of which are hereby incorporated by reference.

BACKGROUND

The disclosure relates to a power supply system for a vehicle.

Japanese Unexamined Patent Application Publication No. 2011-046248 discloses the following power supply system installed in a vehicle. In this power supply system, power can be supplied to a starter motor from both of a low-voltage battery and a DC-to-DC converter. When driving the starter motor, the output voltage of the DC-to-DC converter is changed in accordance with the internal loss (friction) of an engine.

SUMMARY

An aspect of the disclosure provides a power supply system for a vehicle. The vehicle includes a driving motor, a driving battery, a plurality of devices other than the driving motor, a first device battery, a second device battery, a DC-to-DC converter. The driving battery is configured to supply power to the driving motor. The devices include a control system device and a specific device. The specific device is configured to consume a larger amount of power than the control system device. The first device battery and the second device battery are configured to supply power to the plural devices. The DC-to-DC converter is configured to generate a power supply voltage from power of the driving battery. The power supply voltage is to be supplied to the plural devices. The power supply system includes a first power line, a second power line, a first switch, a coupling line, and a second switch. The first power line is configured to transmit power from the first device battery to the control system device. The second power line is configured to transmit power from the second device battery to the specific device. The first switch is configured to be coupled between the DC-to-DC converter and the first power line. The first switch includes a diode that is disposed in a direction to flow a current to the first power line. The coupling line is configured to transmit power from a node between the DC-to-DC converter and the first switch to the second power line. The second switch is configured to selectively open and close an electric circuit of the coupling line.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Among devices installed in a vehicle, some devices temporarily consume a large amount of power. Examples of such devices are a starter motor and a power steering system. A vehicle may include plural power sources, such as a first device battery that supplies power to various electric devices, a second device battery that supplies power to a specific device, and a DC-to-DC converter.

In a vehicle including plural power sources, when power is supplied to a specific device that temporarily consumes a large amount of power, power may be flexibly supplied from a power source which is normally used for another device, as well as from the power source used for this specific device. This can operate the specific device correctly without increasing the capacities of the individual power sources. However, if no measure is taken when flexibly supplying power from another power source, a voltage drop, for example, may occur, which may influence this power source. This may impair the operation of a device receiving power from this power source.

It is desirable to provide a power supply system for a vehicle, which can flexibly supply power to a specific device temporarily consuming a large amount of power from a power source used for a device other than the specific device, while reducing an influence of a voltage drop, for example, on this power source.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
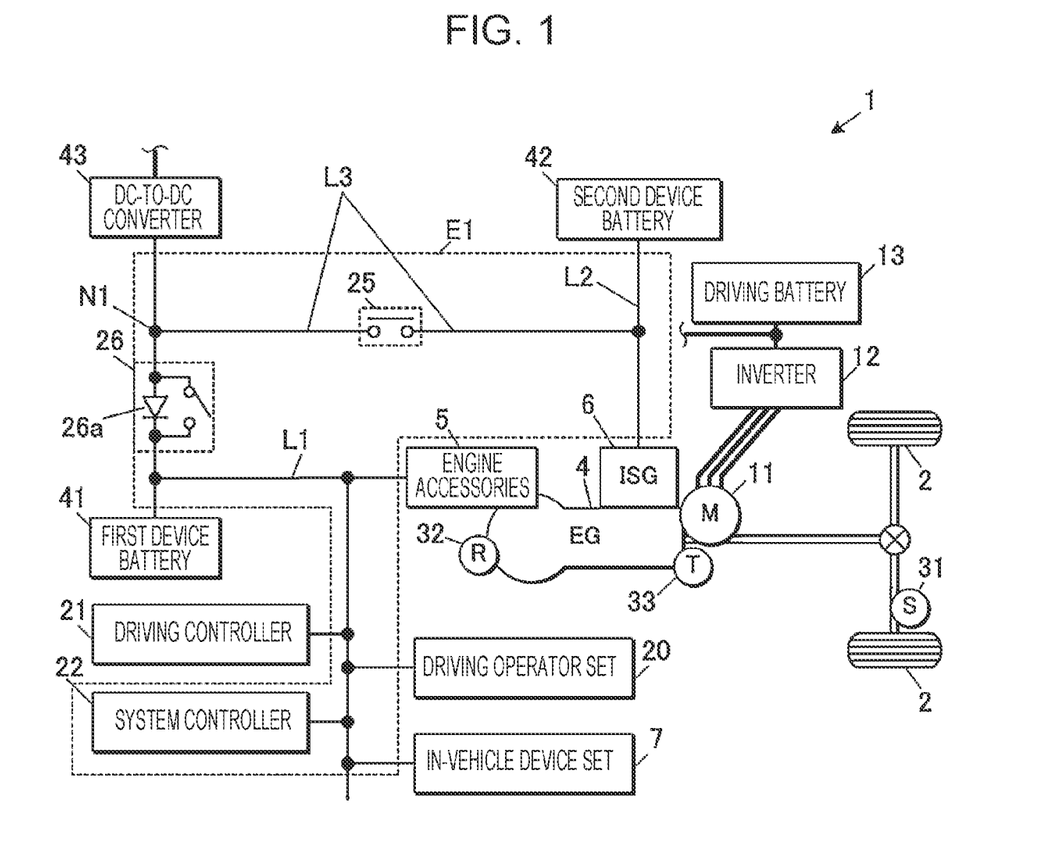
FIG. 1 is a schematic diagram of a vehicle including a power supply system according to an embodiment of the disclosure.

FIG. 1 is a schematic diagram of a vehicle 1 including a power supply system according to the embodiment. The vehicle 1 is a hybrid electric vehicle (HEV) and includes driving wheels 2, an engine 4, engine accessories 5, an integrated starter generator (ISG) 6, a driving motor 11, an inverter 12, a driving battery 13, a driving operator set 20, a driving controller 21, a system controller 22, and an in-vehicle device set 7. The engine 4 outputs power to the driving wheels 2. The engine accessories 5 drive the engine 4. The ISG 6 starts or restarts the engine 4. The driving motor 11 outputs power to the driving wheels 2. The inverter 12 drives the driving motor 11. The driving battery 13 supplies driving electricity to the inverter 12. The driving operator set 20 receives manipulation from a driver of the vehicle 1. The driving controller 21 controls the driving of the vehicle 1. The system controller 22 controls the system of the vehicle 1. The in-vehicle device set 7 includes a heater, for example. In one embodiment of the disclosure, the ISG 6 may serve as a "specific device" and as a "restarter motor", and the system controller 22 may serve as a "switching controller".

The driving battery 13 is a lithium-ion battery or a nickel-metal hydride battery, for example, and outputs a voltage higher than a power supply voltage (12 V) used for the devices.

The ISG 6 serves as a generator for generating electricity by absorbing part of power for the vehicle 1 and also serves as an electric motor for outputting power for starting or restarting the engine 4. The ISG 6 temporarily consumes a large amount of power when starting or restarting the engine 4.

The driving operator set 20 includes an acceleration operator, a braking operator, a steering operator, and a starting operator.

The driving operator set 20 sends a signal indicating an operation amount of the accelerator operator and a signal indicating an operation amount of the braking operator to the driving controller 21. In response to these signals, the driving controller 21 drives the engine accessories 5 to operate the engine 4 or drives the inverter 12 to operate the driving motor 11. The starting operator is an ignition lock cylinder or a start button, for example, which can be operated to start the vehicle 1. In response to the starting operation, the system controller 22 drives control system devices, such as the driving controller 21 and the system controller 22, and also starts the engine 4, thereby making it possible to run the vehicle 1.

The vehicle 1 also includes a vehicle speed sensor 31, an engine speed sensor 32 that detects the speed of the engine 4, and a coolant temperature sensor 33 that measures the temperature of a coolant for the engine 4. The vehicle speed sensor 31, the engine speed sensor 32, and the coolant temperature sensor 33 each output a detection signal to the system controller 22.

The vehicle 1 also includes first and second device batteries 41 and 42, a DC-to-DC converter 43, first and second power lines L1 and L2, a coupling line L3, a relay 25, and a semiconductor switch 26. The first device battery 41 supplies power to the control system devices, such as the driving controller 21 and the system controller 22. The second device battery 42 supplies power to the ISG 6. The DC-to-DC converter 43 converts a high voltage of the driving battery 13 to a power supply voltage (12 V) used for the devices. The power supply voltage is supplied to the first and second power lines L1 and L2 and the coupling line L3. The relay 25 and the semiconductor switch 26 each switch a power supply path. In an embodiment of the disclosure, the semiconductor switch 26 may serve as a "first switch", while the relay 25 may serve as a "second switch". The first and second power lines L1 and L2, the coupling line L3, the relay 25, the semiconductor switch 26, and the system controller 22 may serve as a power supply system E1 in an embodiment of the disclosure.

The first and second device batteries 41 and 42 are lead-acid batteries, for example, and output a power supply voltage (12 V) for the devices. The first power line L1 is coupled to the first device battery 41, the engine accessories 5, the control system devices (driving controller 21 and system controller 22), the driving operator set 20, and the in-vehicle device set 7, and transmits power from the first device battery 41 to the engine accessories 5, the control system devices, the driving operator set 20, and the in-vehicle device set 7. The second power line L2 is coupled to the second device battery 42 and the ISG 6 and transmits power from the second device battery 42 to the ISG 6. The semiconductor switch 26 is coupled between the output terminal of the DC-to-DC converter 43 and the first power line L1. The semiconductor switch 26 includes a diode 26a disposed in a direction to flow a current to the first power line L1. The diode 26a is disposed in parallel with a switching portion of the semiconductor switch 26 and may be a parasitic diode. The coupling line L3 links the second power line L2 and a node N1 and transmits power therebetween. The node N1 is disposed on the electric circuit between the DC-to-DC converter 43 and the semiconductor switch 26. The relay 25 is disposed on the electric circuit of the coupling line L3 and selectively opens and closes the electric circuit. The relay 25 and the semiconductor switch 26 are controlled by the system controller 22.

The DC-to-DC converter 43 has a switching function of switching the output capability between a regular output capability and a high output capability. The high output capability is higher than the regular output capability. In an embodiment of the disclosure, the regular output capability may correspond to a first capability, while the high output capability may correspond to a second capability. When the DC-to-DC converter 43 is operating with the regular output capability, the maximum output current is limited to a first current value. When the regular output capability is switched to the high output capability, the maximum output current is raised to a second current value higher than the first current value. The DC-to-DC converter 43 can continue operating with the high output capability only for a limited period of time. Additionally, it is not possible to switch the regular output capability to the high output capability unless a predetermined time interval elapses. The output capability may be switched in a different manner. For example, the output capability may be switched by increasing or decreasing the output voltage.

In the above-described power supply system E1, the second device battery 42 is charged by power generation of the ISG 6, while the driving battery 13 is charged by regenerative operation of the driving motor 11. The first device battery 41 is charged with power of the driving battery 13 or regenerative power of the driving motor 11 which is converted by the DC-to-DC converter 43.

(Idle Stop Function)

The system controller 22 has an idle stop function of stopping idling of the engine 4 when the vehicle 1 temporarily stops running or stops regenerative charging during HEV driving. After stopping idling of the engine 4, the system controller 22 restarts the engine 4 in response to an instruction.

(Estimation of Internal Loss of Engine)

The internal loss of the engine 4 varies in response to the temperature and also in accordance with other factors, such as the total driving distance, degradation over time, and maintenance situation. The changing pattern of the internal loss of the engine 4 in response to the temperature is substantially uniform even when the internal loss is changed in response to another factor. Accordingly, if the internal loss of the engine 4 at a certain temperature is found by measurement, the internal loss at a different temperature can be estimated by adding or subtracting a change in the amount of internal loss corresponding to a difference in the temperature.

In "READY-ON" processing, which will be discussed later, the system controller 22 measures the internal loss of the engine 4 when it is cold. At the time of engine restart processing, based on this measured internal loss and the temperature of the engine 4 (coolant temperature), the system controller 22 can estimate the internal loss of the engine 4 at the restarting time.

(Engine Restart Processing)

Figure 2:
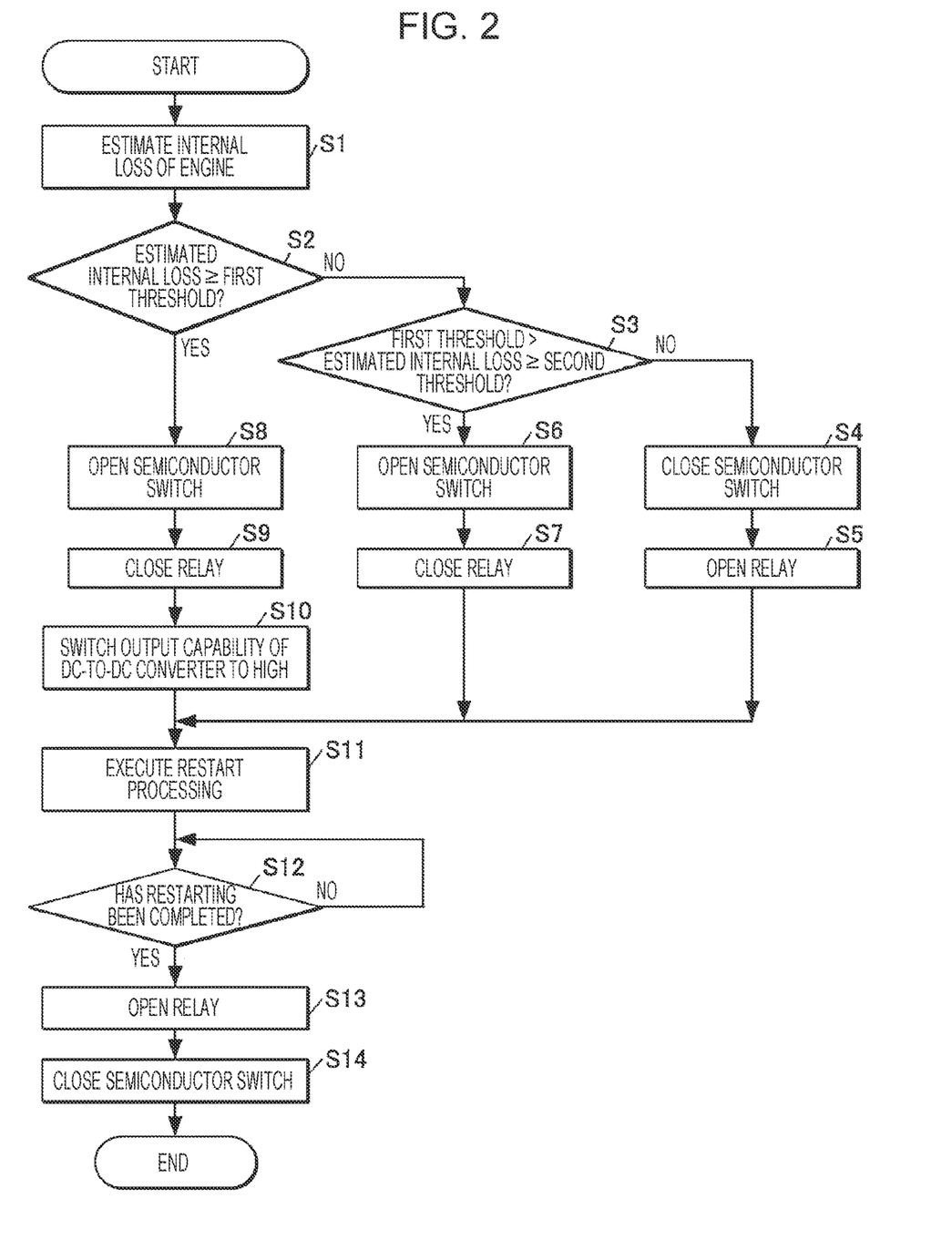
FIG. 2 is a flowchart illustrating engine restart processing executed by a system controller.

FIG. 2 is a flowchart illustrating engine restart processing executed by the system controller 22. Engine restart processing begins when an instruction to restart the engine 4 is received after the engine 4 stops idling. At the start of engine restart processing, in step S1, the system controller 22 first estimates the current internal loss of the engine 4 in the above-described manner, based on the temperature of a coolant in the engine 4 and the internal loss of the engine 4 measured in "READY-ON" processing when it is cold.

If a change in the internal loss in response to the temperature is much larger than that in response to another factor, the system controller 22 may not necessarily measure the internal loss of the engine 4 when it is cold. In this case, the system controller 22 may estimate the internal loss of the engine 4 merely from the coolant temperature at the time of receiving an instruction to restart the engine 4.

The system controller 22 then compares the estimated internal loss with first and second thresholds. If the estimated internal loss is found to be greater than or equal to the first threshold in step S2, the system controller 22 determines that the internal loss is high. If the estimated internal loss is found to be smaller than the first threshold and is greater than or equal to the second threshold in step S3, the system controller 22 determines that the internal loss is intermediate. If the estimated internal loss is found to be smaller than the second threshold in step S3, the system controller 22 determines that the internal loss is low. The value of the second threshold is determined as follows, for example. When the estimated internal loss is smaller than the value of the second threshold, the engine 4 can be restarted by the maximum output of the second device battery 42. The value of the first threshold is determined as follows, for example. When the estimated internal loss is smaller than the value of the first threshold, the engine 4 can be restarted by the total output of the maximum output of the second device battery 42 and that with the regular output capability of the DC-to-DC converter 43.

As a result of steps S2 and S3, if the internal loss of the engine 4 is found to be low, the system controller 22 first closes the semiconductor switch 26 in step S4 and then opens the relay 25 in step S5. Then, in step S11, the system controller 22 executes processing for restarting the engine 4 by driving the ISG 6. As a result of opening the relay 25 in step S5, the first power line L1 and the second power line L2 are disconnected from each other. Even if a large amount of power is consumed by the ISG 6, an adverse influence is not produced on the first power line L1. As a result of closing the semiconductor switch 26 in step S4, power can be supplied from the DC-to-DC converter 43 to the first power line L1 with a small loss.

As a result of steps S2 and S3, if the internal loss of the engine 4 is found to be intermediate, the system controller 22 first opens the semiconductor switch 26 in step S6 and then closes the relay 25 in step S7. Then, in step S11, the system controller 22 executes processing for restarting the engine 4 by driving the ISG 6. As a result of opening the semiconductor switch 26 and closing the relay 25, power is supplied from the second device battery 42 and the DC-to-DC converter 43 to drive the ISG 6. It is now assumed that a voltage drop occurs in the second power line L2 and the coupling line L3 due to temporal power consumption by the ISG 6. Even in this case, since the semiconductor switch 26 is opened, a current does not flow from the first power line L1 to the second power line L2 does not occur. The voltage of the first power line L1 is thus stabilized, and the control system circuit is not reset. Additionally, if the in-vehicle device set 7 is consuming a large amount of power and if the DC-to-DC converter 43 has enough power left to output, the DC-to-DC converter 43 outputs part of power to the first power line L1 via the diode 26a of the semiconductor switch 26. In this manner, even if the in-vehicle device set 7 is consuming a large amount of power, the voltage of the first power line L1 is less likely to become unstable.

The semiconductor switch 26 is first opened in step S6 before the relay 25 is closed in step S7. This can prevent direct coupling between the first power line L1 and the second power line L2. Even if the voltage of the second device battery 42 is low and that of the first device battery 41 is high, the current does not flow from the first device battery 41 to the second device battery 42. The voltage of the first power line L1 is thus less likely to become unstable during the switching of the relay 25 and the semiconductor switch 26. The order of steps S6 and S7 may be reversed if the system controller 22 sets the output voltage of the DC-to-DC converter 43 to be higher than or equal to the voltage of the first power line L1 during the switching of the relay 25 and the semiconductor switch 26. With this control operation, it is possible to prevent a current from flowing from the first device battery 42 to the second device battery 42.

As a result of step S2, if the internal loss of the engine 4 is found to be high, the system controller 22 first opens the semiconductor switch 26 in step S8 and then closes the relay 25 in step S9. Then, in step S10, the system controller 22 switches the output capability of the DC-to-DC converter 43 to be high. Then, in step S11, the system controller 22 executes processing for restarting the engine 4 by driving the ISG 6. As a result of opening the semiconductor switch 26 and closing the relay 25, power is supplied from the second device battery 42 and the DC-to-DC converter 43 with the high output capability to drive the ISG 6. It is now assumed that a voltage drop occurs in the second power line L2 and the coupling line L3 due to temporal power consumption by the ISG 6. Even in this case, since the semiconductor switch 26 is opened, a current does not flow from the first power line L1 to the second power line L2. The voltage of the first power line L1 is thus stabilized, and the control system circuit is not reset. Additionally, if the in-vehicle device set 7 is consuming a large amount of power and if the DC-to-DC converter 43 has enough power left to output, the DC-to-DC converter 43 outputs part of power to the first power line L1 via the diode 26a of the semiconductor switch 26. In this manner, even if the in-vehicle device set 7 is consuming a large amount of power, the voltage of the first power line L1 is less likely to become unstable.

The semiconductor switch 26 is first opened in step S8 before the relay 25 is closed in step S9. This can prevent direct coupling between the first power line L1 and the second power line L2. Even if the voltage of the second device battery 42 is low and that of the first device battery 41 is high, the current does not flow from the first device battery 41 to the second device battery 42. The voltage of the first power line L1 is thus less likely to become unstable during the switching of the relay 25 and the semiconductor switch 26.

After executing processing for restarting the engine 4 in step S11, the system controller 22 waits until the engine 4 enters a complete combustion state and finishes restarting operation in step S12. When the engine 4 has finished restarting, the system controller 22 opens the relay 25 in step S13 and then closes the semiconductor switch 26 in step S14. If the semiconductor switch 26 is closed in step S4 and the relay 25 is opened in step S5, the system controller 22 maintains this switching states. Engine restart processing has been completed.

The relay 25 is first opened in step S13 before the semiconductor switch 26 is closed in step S14. This can prevent direct coupling between the first power line L1 and the second power line L2. Hence, a current does not flow from the first device battery 41 to the second device battery 42.

With the above-described engine restart processing, without increasing the capacity of the second device battery 42, power can be supplied to drive the ISG 6 in accordance with the load on the ISG 6, that is, depending on the level of the internal loss of the engine 4. Even when the load on the ISG 6 is high and power is flexibly supplied from the DC-to-DC converter 43 to the ISG 6, an influence of a voltage drop, for example, is less likely to be produced on the first power line L1. This can stabilize the power supply voltage of the control system devices.

In the example of engine restart processing in FIG. 2, the patterns of power supply to the ISG 6 include: a first supply pattern implemented by the switching operations in steps S4 and S5; a second supply pattern implemented by the switching operations in steps S6 and S7; and a third supply pattern implemented by the switching operations in steps S8 through S10. However, the patterns of power supply to the ISG 6 are not restricted to the above-described patterns. For example, the system controller 22 may stop driving a device of the in-vehicle device set 7. Processing for stopping driving a device of the in-vehicle device set 7 may be added to the second supply pattern or the third supply pattern. Alternatively, a power supply pattern, which is a combination of processing in steps S8 through S10 and processing for stopping driving a device of the in-vehicle device set 7, may be provided as a fourth supply pattern. When the load on the ISG 6 is very high, the fourth supply pattern may be selected. Stopping driving a device of the in-vehicle device set 7 can increase the amount of power to be supplied from the DC-to-DC converter 43 to the ISG 6. As a device of the in-vehicle device set 7 to be stopped, a heater, an indicator, such as an instrument panel, a rear window defroster, or an air-conditioning blower fan, which is less likely to influence other devices even if it is stopped, may be used.

(Measurement Method for Internal Loss of Engine)

Figure 3:
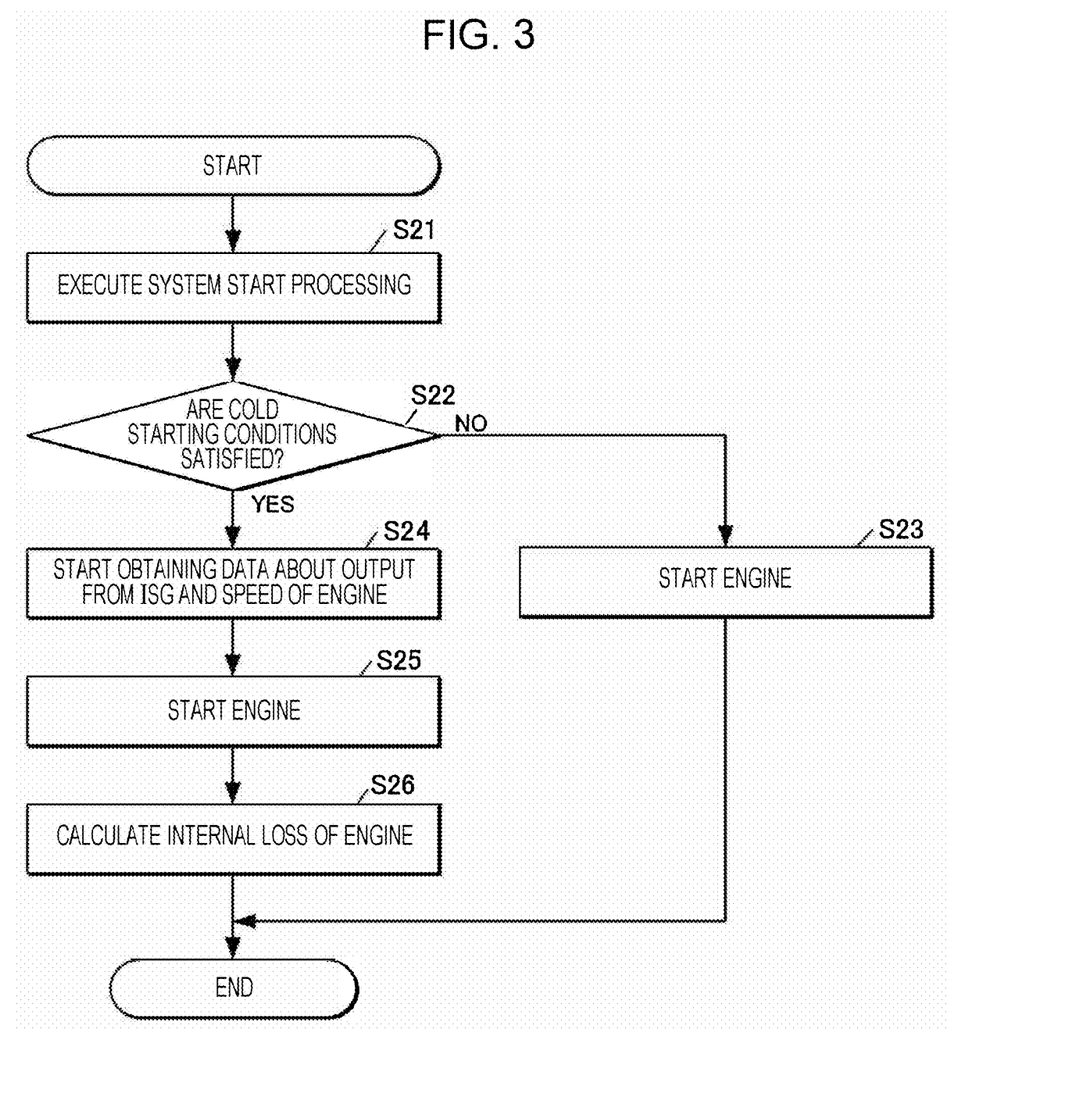
FIG. 3 is a flowchart illustrating "READY-ON" processing executed by the system controller.
Figure 4:
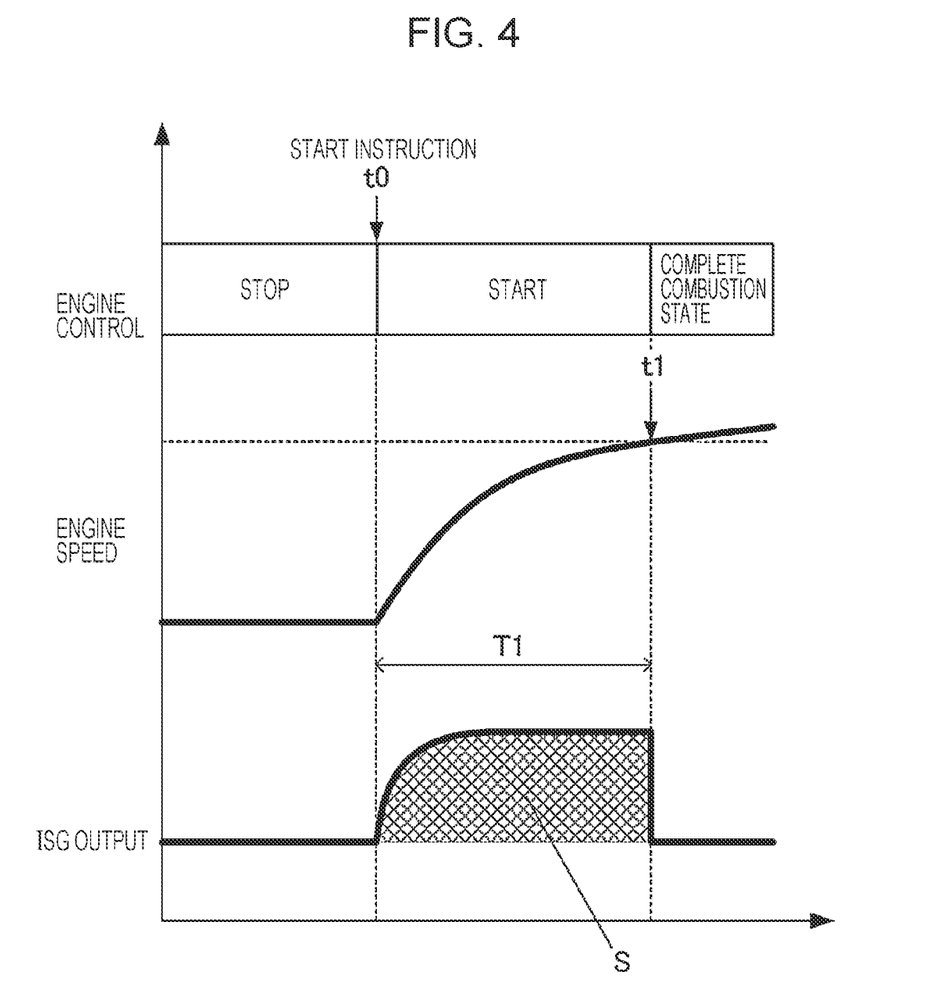
FIG. 4 is a timing chart for explaining measurement processing for the internal loss of an engine.

An example of the measurement method for the internal loss of the engine 4 will be discussed below. FIG. 3 is a flowchart illustrating "READY-ON" processing executed by the system controller 22. FIG. 4 is a timing chart for explaining measurement processing for the internal loss of the engine 4.

The system controller 22 measures the internal loss of the engine 4 in "READY-ON" processing. "READY-ON" processing is started as a result of the driver of the vehicle 1 operating the starting operator of the driving operator set 20. At the start of "READY-ON" processing, in step S11, the system controller 22 executes system start processing, such as starting another control system device. Then, in step S22, the system controller 22 judges whether cold starting conditions are satisfied. Cold starting is performed, for example, when the driver operates the engine 4 for the first time after starting the vehicle 1. Cold starting conditions are satisfied when the value of a soak timer (the period of time from when the engine 4 has stopped last time until when it is started) is greater than or equal to a threshold and when the temperature of a coolant in the engine 4 is smaller than or equal to a threshold. The threshold for the value of the soak timer is set to be a time length for which heat generated by driving the engine 4 is sufficiently dissipated to the outside. The threshold for the coolant temperature is set to be a temperature at which heat generated by operating the engine 4 is sufficiently dissipated to the outside. If the cold starting conditions are not found to be satisfied in step S22, the system controller 22 starts the engine 4 in step S23 and completes "READY-ON" processing.

If the cold starting conditions are found to be satisfied in step S22, the system controller 22 starts obtaining data about output energy from the ISG 6 and the speed of the engine in step S24. The system controller 22 can detect output energy from the ISG 6 from the output current from the second device battery 42. Then, in step S25, the system controller 22 beings start processing for the engine 4.

As illustrated in FIG. 4, when engine start processing has begun at timing t0, drive force is output from the ISG 6 to the engine 4 by using power from the second device battery 42, and the speed of the engine 4 rises in period T1. As the speed of the engine 4 is rising, fuel injection and ignition are started by the engine accessories 5, and the engine 4 enters the complete combustion state at timing t1 in which it can be driven by fuel combustion alone. It can be identified that the engine 4 has reached the complete combustion state from the speed of the engine 4 or from the phase difference between the ignition timing and the crankshaft timing. For example, when the speed of the engine 4 is higher than or equal to a threshold which is set for the speed in the complete combustion state, it means that the engine 4 has entered the complete combustion state.

The system controller 22 obtains time-series data about output energy from the ISG 6 and the speed of the engine 4 concerning period T1, and calculates the internal loss of the engine 4 based on the time-series data in step S26. When the internal loss of the engine 4 is high, the ratio of a rise in the speed of the engine 4 to the output energy from the ISG 6 is low. When the internal loss of the engine 4 is low, the ratio of a rise in the speed of the engine 4 to the output energy from the ISG 6 is high. That is, the value obtained by standardizing a rise in the speed of the engine 4 by the output energy from the ISG 6 is correlated with the internal loss of the engine 4. In other words, the internal loss of the engine 4 can be calculated from this standardized value. The system controller 22 stores a function or a data table representing the relationship between the internal loss and the standardized value, and calculates the internal loss from the function or the data table. The function or the data table may be found by experiment or simulation.

After calculating the internal loss, the system controller 22 completes "READY-ON" processing. As a result of executing such "READY-ON" processing, the system controller 22 can measure the internal loss of the engine 4 when it is cold. By using the internal loss measured in "READY-ON" processing, in step S1 of engine restart processing in FIG. 2, the system controller 22 can estimate the internal loss of the engine 4 at the temperature at which the engine 4 is restarted.

In step S26, instead of using the time-series data about output energy from the ISG 6 and the speed of the engine 4, the system controller 22 may determine the internal loss of the engine 4 from a time length from when start processing has begun until when the engine 4 has entered the complete combustion state during period T1, the quantity of work of the ISG 6 indicated by the area S in FIG. 4 during period T1, and a rate of change in the speed of the engine 4 (average of the slope in FIG. 4) during period T1. Additionally, instead of measuring the internal loss of the engine 4 when it is started, the system controller 22 may measure the internal loss of the engine 4 when it is stopped. For example, when the vehicle 1 has stopped driving or is driving by using the driving motor 11, the system controller 22 may drive the engine 4 and measure the internal loss of the engine 4.

As described above, the vehicle 1 and the power supply system E1 according to the embodiment includes the semiconductor switch 26 with the diode 26a and the relay 25 that selectively opens and closes the electric circuit of the coupling line L3. As a result of switching each of the semiconductor switch 26 and the relay 25, the system controller 22 can suitably change the power supply pattern. For example, depending on the load on the ISG 6, power is supplied from the second device battery 42 alone or is supplied from both of the second device battery 42 and the DC-to-DC converter 43. Even when power is flexibly supplied from the DC-to-DC converter 43, an influence of a voltage drop, for example, is less likely to be produced on the first power line L1.

In the vehicle 1 and the power supply system E1 according to the embodiment, the system controller 22 switches the semiconductor switch 26 and the relay 25, based on the estimated value of the internal loss of the engine 4. Hence, the power supply pattern can be selected in accordance with the level of the load on the ISG 6.

In the vehicle 1 and the power supply system E1 according to the embodiment, the system controller 22 switches the output capability of the DC-to-DC converter 43 to be high, based on the estimated value of the internal loss of the engine 4. When the load on the ISG 6 is high, power from the DC-to-DC converter 43 is increased so that the ISG 6 can be driven appropriately.

In the vehicle 1 and the power supply system E1 according to the embodiment, the power supply patterns to be used based on the level of the internal loss of the engine 4 include: a pattern of supplying power from the second device battery 42 alone; a pattern of supplying power from both of the second device battery 42 and the DC-to-DC converter 43; and a pattern of supplying power from the second device battery 42 and increased power from the DC-to-DC converter 43. By selecting one of these power supply patterns, power can be supplied appropriately based on the load on the ISG 6 while using a suitable amount of capacity of the second device battery 42.

In the vehicle 1 and the power supply system E1 according to the embodiment, the specific device that receives power from the second device battery 42 is the ISG 6. The ISG 6 temporarily consumes a large amount of power when starting or restarting the engine 4. Additionally, in the vehicle 1 having an idle stop function, the load on the ISG 6 changes in response to the temperature (internal loss) of the engine 4. If the ISG 6 is driven by one device battery alone, a large-capacity device battery is commonly used even though it is not frequently operated. To address this issue, in the power supply system E1 in the embodiment, the ISG 6 is used as the specific device. This makes it possible to drive the ISG 6 appropriately without significantly increasing the capacity of the second device battery 42.

The embodiment has been discussed by way of example, and the disclosure is not limited thereto. For example, in the embodiment, the ISG 6 is used as the specific device coupled to the second power line L2. However, any device may be used as the specific device if this device temporarily consumes a large amount of power and the load on this device changes in response to a certain factor. Examples of such a device are an assist motor in a power steering system and a fluid pressure adjuster for a braking device in an antilock braking system (ABS) or a traction control system (TCS). Details of the embodiment may be modified without departing from the scope and spirit of the disclosure.

According to an embodiment of the disclosure, as a result of closing the first switch, power can be transmitted from the DC-to-DC converter to the first power line with a small loss and is further supplied to the first device battery and the control system devices. As a result of opening the first switch and closing the second switch, output from the DC-to-DC converter can be transmitted to the second power line and be supplied to the specific device. Since the first switch is opened, a current is less likely to flow from the first power line to the second power line. Even when the first switch is opened, power can be supplied from the DC-to-DC converter to the first power line via the diode of the first switch. When the specific device temporarily consumes a large amount of power, the first and second switches are suitably switched to flexibly supply power from the DC-to-DC converter to operate the specific device. Even with the use of power from the DC-to-DC converter, an influence of a voltage drop, for example, is less likely to be produced on the first power line. As a result, without increasing the capacities of the first and second device batteries and the DC-to-DC converter, the specific device can be operated by flexibly receiving power. This does not influence the stable operation of the control system devices that receive power via the first power line.

The invention claimed is:

1. A power supply system for a vehicle, the vehicle comprising:
   a driving motor;
   a driving battery configured to supply power to the driving motor;
   a first device configured to perform a first function of the vehicle;
   a second device configured to perform a second function of the vehicle, wherein the second function is different from the first function, and the second device is configured to consume a larger amount of power than the control system first device;
   a first device battery configured to supply power to the first device;
   a second device battery configured to supply power to the second device; and
   a DC-to-DC converter configured to generate a power supply voltage from the power of the driving battery, the power supply voltage being to be supplied to the first device and the second device,
   the power supply system comprising:
   a first power line coupling the first device battery to the first device so that the power from the first device battery is supplied to the first device, the first power line having a first node between the first device battery and the first device;
   a second power line coupling the second device battery to the second device so that the power from the second device battery is supplied to the second device, the second power line having a second node between the second device battery and the second device;
   a first switch having a first terminal connected to the first node and a second terminal connected to the DC-to-DC converter, and configured to couple the DC-to-DC converter to the first power line, the first switch comprising a diode that is disposed to allow a current to flow toward to the first power line; and
   a second switch having a third terminal connected to the DC-to-DC converter and the second terminal of the first switch and a fourth terminal connected to the second node, and configured to selectively couple the DC-to-DC converter to the second power line.

2. The power supply system according to claim 1, further comprising a switching controller configured to control the first and second switches, based on information about a load on the second device.

3. The power supply system according to claim 2, wherein:
the DC-to-DC converter has a switching function of switching an output capability; and
based on the information about the load on the second device, the switching controller switches the output capability of the DC-to-DC converter between a first capability and a second capability, the second capability being higher than the first capability.

4. The power supply system according to claim 3, wherein the information about the load on the second device is an estimated value of the load on the second device;
the switching controller closes the first switch and opens the second switch when an estimated value of the load on the second device is smaller than a first threshold;
the switching controller opens the first switch, closes the second switch, and switches the output capability of the DC-to-DC converter to the first capability when the estimated value of the load on the second device is greater than or equal to the first threshold and smaller than a second threshold; and
the switching controller opens the first switch, closes the second switch, and switches the output capability of the DC-to-DC converter to the second capability when the estimated value of the load on the second device is greater than or equal to the second threshold.

5. The power supply system according to claim 4, wherein the second device is a restarter motor, the load on the restarter motor being to be changed in response to an internal loss of an engine of the vehicle.

6. The power supply system according to claim 3, wherein the second device is a restarter motor, the load on the restarter motor being to be changed in response to an internal loss of an engine of the vehicle.

7. The power supply system according to claim 2, wherein the second device is a restarter motor, the load on the restarter motor being to be changed in response to an internal loss of an engine of the vehicle.

8. The power supply system according to claim 1, wherein the second device is a restarter motor, a load on the restarter motor being to be changed in response to an internal loss of an engine of the vehicle.

9. A power supply system for a vehicle, the vehicle comprising:
a driving motor;
a driving battery configured to supply power to the driving motor;
a first device configured to perform a first function of the vehicle;
a second device configured to perform a second function of the vehicle, wherein the second function is different from the first function, and the second device is configured to consume a larger amount of power than the first device;
a first device battery configured to supply power to the first device;
a second device battery configured to supply power to the second device; and
a DC-to-DC converter configured to generate a power supply voltage from the power of the driving battery, the power supply voltage being to be supplied to the first device and the second device,
the power supply system comprising:
a first power line configured to transmit the power from the first device battery to the first device;
a second power line configured to transmit the power from the second device battery to the second device;
a first switch configured to be coupled between the DC-to-DC converter and the first power line, the first switch comprising a diode that is disposed to allow a current to flow toward the first power line;
a coupling line configured to transmit power from a node between the DC-to-DC converter and the first switch to the second power line;
a second switch configured to selectively open and close an electric circuit of the coupling line; and
a switching controller configured to control the first and second switches, based on information about a load on the second device,
wherein the DC-to-DC converter has a switching function of switching an output capability;
wherein based on the information about the load on the second device, the switching controller switches the output capability of the DC-to-DC converter between a first capability and a second capability, the second capability being higher than the first capability,
wherein the information about the load on the second device is an estimated value of the load on the second device,
wherein the switching controller closes the first switch and opens the second switch when an estimated value of the load on the second device is smaller than a first threshold,
wherein the switching controller opens the first switch, closes the second switch, and switches the output capability of the DC-to-DC converter to the first capability when the estimated value of the load on the second device is greater than or equal to the first threshold and smaller than a second threshold, and
wherein the switching controller opens the first switch, closes the second switch, and switches the output capability of the DC-to-DC converter to the second capability when the estimated value of the load on the second device is greater than or equal to the second threshold.

10. The power supply system according to claim 9, wherein the second device is a restarter motor, the load on the restarter motor being to be changed in response to an internal loss of an engine of the vehicle.

* * * * *